(12) United States Patent  
Zeitoun et al.

(10) Patent No.: US 9,393,502 B1  
(45) Date of Patent: *Jul. 19, 2016

(54) DESALINATION SYSTEM

(71) Applicant: KING SAUD UNIVERSITY, Riyadh (SA)

(72) Inventors: Obida Mohamed Zeitoun, Riyadh (SA); Hany Abdelrahman Alansary, Riyadh (SA); Abdullah Othman Nuhait, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,993

(22) Filed: Jul. 2, 2015

(51) Int. Cl.
| | |
|---|---|
| C02F 1/04 | (2006.01) |
| B01D 3/06 | (2006.01) |
| B01D 3/00 | (2006.01) |
| C02F 1/06 | (2006.01) |
| B01D 1/28 | (2006.01) |
| B01D 1/26 | (2006.01) |
| C02F 103/08 | (2006.01) |

(52) U.S. Cl.
CPC *B01D 3/065* (2013.01); *B01D 1/26* (2013.01); *B01D 1/28* (2013.01); *B01D 3/007* (2013.01); *C02F 1/041* (2013.01); *C02F 1/06* (2013.01); *C02F 2103/08* (2013.01); *C02F 2301/08* (2013.01)

(58) Field of Classification Search
CPC ......... C02F 1/04; C02F 2103/08; B01D 1/26; B01D 1/28
See application file for complete search history.

(56) References Cited

U.S. PATENT DOCUMENTS

| | | | | | |
|---|---|---|---|---|---|
| 3,345,272 | A | * | 10/1967 | Collins ................. | B01D 3/346 159/13.4 |
| 3,351,120 | A | * | 11/1967 | Goeldner ................ | B01D 1/26 159/13.3 |
| 3,713,989 | A | * | 1/1973 | Bom ...................... | B01D 3/065 159/2.3 |
| 3,844,899 | A | * | 10/1974 | Sager, Jr. ................. | C02F 1/06 159/18 |
| 3,941,663 | A | * | 3/1976 | Steinbruchel ........... | B01D 1/26 159/13.3 |
| 4,046,637 | A | * | 9/1977 | Sasaki ..................... | B01D 3/24 202/174 |

(Continued)

FOREIGN PATENT DOCUMENTS

| | | |
|---|---|---|
| CN | 102502903 | 6/2012 |
| CN | 102557168 B | * 10/2013 ............... B01D 1/26 |

*Primary Examiner* — Renee E Robinson  
*Assistant Examiner* — Jonathan Miller  
(74) *Attorney, Agent, or Firm* — Richard C. Litman

(57) ABSTRACT

The desalination system is a multi-stage flash desalination (MSF) system. Each stage has a P-shaped chamber having a flashing section extending vertically, a condensing section extending horizontally to overlay the flashing section of the next succeeding stage, and a demister (a device to separate liquid droplets entrained in vapor) separating the flashing section and the condensing section. One or more heat pipes extend between the condensing section of each stage and the flashing section of the next succeeding stage in order to transfer heat released by the condensing vapor in one section to the colder flashing section of the next succeeding chamber. The system includes a seawater-cooled condenser in the last stage to recover fresh water from the water vapor. The system may be modified by replacing or supplementing the condenser in the last stage with a thermal vapor compressor (TVC) to transfer vapor to the first stage.

14 Claims, 3 Drawing Sheets

(56) References Cited

U.S. PATENT DOCUMENTS

| | | | | |
|---|---|---|---|---|
| 4,330,373 A | * | 5/1982 | Liu | C02F 1/14 159/17.1 |
| 4,376,679 A | * | 3/1983 | Liu | B01D 3/065 159/47.1 |
| 5,139,620 A | * | 8/1992 | Elmore | B01D 1/221 159/17.1 |
| 9,028,653 B2 | * | 5/2015 | Kwak | C02F 1/14 202/174 |
| 2010/0078306 A1 | * | 4/2010 | Alhazmy | C02F 1/048 203/10 |
| 2013/0341810 A1 | | 12/2013 | Govindan et al. | |
| 2014/0263081 A1 | | 9/2014 | Thiers | |
| 2014/0299462 A1 | | 10/2014 | Thiers | |

* cited by examiner

DESALINATION SYSTEM

BACKGROUND OF THE INVENTION

1. Field of the Invention

The present invention relates generally to water desalination systems, and particularly to a desalination system that has multiple stages and uses heat pipes to recover and recycle heat energy that would otherwise be lost with the waste brine.

2. Description of the Related Art

Seawater desalination systems are an important technology in many parts of the world where fresh water is difficult to access. Such desalination systems find their greatest practicality in arid areas that are also adjacent to the sea, as in many parts of the Middle East. However, such systems may find use in other parts of the world as well.

There are several different principles that may be used for the desalination or purification of water. The principle that has generally been found to be most efficient and economical is that of vaporizing the seawater and then condensing the pure vapors while leaving the salt and other contaminants behind as more concentrated brine or a dried mass if all of the water is removed. Nevertheless, there are still inefficiencies in such systems due to the loss of heat in the waste brine.

Thus, a desalination system solving the aforementioned problems is desired.

SUMMARY OF THE INVENTION

The desalination system is a multi-stage flash desalination (MSF) system. Each stage has a P-shaped chamber having a flashing section extending vertically, a condensing section extending horizontally to overlay the flashing section of the next succeeding stage, and a demister (a device to separate liquid droplets entrained in vapor) separating the flashing section and the condensing section. One or more heat pipes extend between the condensing section of each stage and the flashing section of the next succeeding stage in order to transfer heat released by the condensing vapor in one section to the colder flashing section of the next succeeding chamber. The system includes a seawater-cooled condenser in the last stage to recover fresh water from the water vapor, and a pre-heater to pre-heat the feed water supplied to the brine heater. The system may be modified by replacing or supplementing the condenser in the last stage with a thermal vapor compressor (TVC), which transfers water vapor from the last stage to the heat pipe(s) in the condensing section of the first stage.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The desalination system is a multi-stage flash desalination (MSF) system. Each stage has a P-shaped chamber having a flashing section extending vertically, a condensing section extending horizontally to overlay the flashing section of the next succeeding stage, and a demister (a device to separate liquid droplets entrained in vapor) separating the flashing section and the condensing section. One or more heat pipes extend between the condensing section of each stage and the flashing section of the next succeeding stage in order to transfer heat released by the condensing vapor in one section to the colder flashing section of the next succeeding chamber. The system includes a seawater-cooled condenser in the last stage to recover fresh water from the water vapor, and a pre-heater to pre-heat the feed water supplied to the brine heater. The system may be modified by replacing or supplementing the condenser in the last stage with a thermal vapor compressor (TVC), which transfers water vapor from the last stage to the heat pipe(s) in the condensing section of the first stage.

Figure 1:
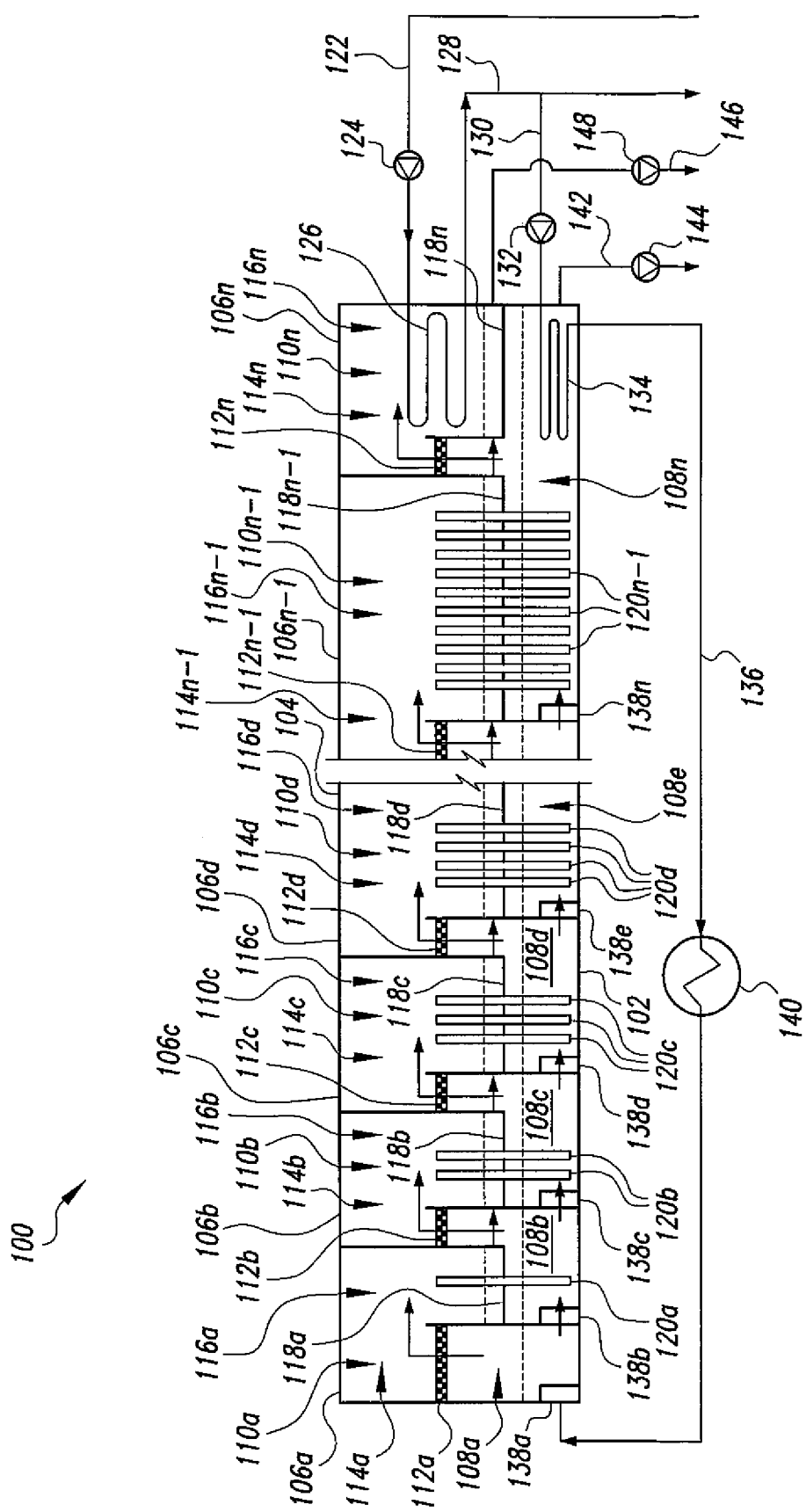
FIG. 1 is a schematic elevation view of a first embodiment of a desalination system according to the present invention.

FIG. 1 of the drawings provides a schematic elevation view of a first embodiment of the desalination system, designated as desalination system 100. The desalination system 100 is a generally closed structure having a floor 102 and a ceiling 104 overlying the floor, and a sequence of stages disposed between the floor and ceiling. The stages comprise flash chambers, including a first stage 106a, a plurality of successive intermediate stages, and a final stage 106n. FIG. 1 shows the successive intermediate stages comprising a second stage 106b, a third stage 106c, a fourth stage 106d, and a penultimate stage 106n-1. It will be noted that the desalination system 100 illustrated in FIG. 1 is of indeterminate length, and any practical number of successive stages may follow the first stage 106a before the final stage 106n.

Each stage is P-shaped includes a flashing section 108a through 108n and a condensing section 110a through 110n. Each of the flashing sections 108a through 108n extends from the underlying floor 102 upward to a top located at some intermediate height or level above the floor 102 but below the overlying ceiling 104. A demister 112a through 112n separates each flashing section 108a-108n from its corresponding condensing section 110a-110n, respectively, and defines the top of the flashing section, as illustrated in FIG. 1. The demisters 112a-112n remove any liquid droplets of saline water from the fresh water vapor before the water vapor enters the condensing sections 110a-110n.

Each condensing section 110a through 110n comprises a first portion 114a through 114n extending upward from the underlying demister 112a-112n to the overlying ceiling 104 of the structure, and a second portion 116a through 116n extending laterally from the first portion. The bottom of each second portion 116a-116n is defined by a water collection tray 118a through 118n, which overlies a portion of the flashing section 108b-108n of the next adjacent or successive stage.

Each stage preceding the final stage further includes at least one heat pipe having an upper portion disposed in the condensing section, continuing through the water collection tray, and extending into the flashing section of the next succeeding stage or chamber. In the embodiment of FIG. 1, a single first heat pipe 120a extends upward from the flashing section 108b of the second stage through the overlying collection tray 118a, and into the second portion 116a of the preceding condensation chamber 110a. It will be seen in the embodiment of FIG. 1 that each successive stage contains one more heat pipe than the preceding stage, i.e., the first condensing section 110a has a single heat pipe 120a, the second condensing section 110b has two heat pipes 120b, the third condensing section 110c has three heat pipes 120c, etc., through the penultimate condensing section 110n-1. The heat pipes 120a-120n-1 transfer heat released by condensation of water vapor in the condensing sections 110a-110n-1 to the flashing sections 108b-108n of the next successive stage. This heat would otherwise be lost during the desalination process. The heat pipes 120a-120n-1 are used to provide for condensation of fresh water in each stage 106a-106n in lieu of the counterflow of the feed seawater through heat exchange tubes in conventional multi-stage flash desalination systems. While the heat pipes 120a-120n-1 are shown as straight vertical elements in FIG. 1, it should be noted that they may be formed as non-straight units and/or may have some inclination from the vertical, if desired. Pulsating operation of the heat pipe system may also be used, if desired.

Referring to FIG. 1, seawater is supplied to the desalination system 100 by an inlet line 122. A pump 124 in the inlet line provides the required motive force to transfer the seawater to the system 100. The inlet line 122 communicates with a condenser 126 disposed within the final condensing section 110n that is used to recover fresh water from the vapor in the last flash chamber or stage 106n, the seawater being used to cool the condenser 126. After cooling the condenser 126, the seawater enters an outlet line 128 that exits the system 100 to return to its source. In the embodiment of FIG. 1, a portion of the seawater exiting the system is withdrawn via a secondary line 130 that extends from the outlet line 128 by a pump 132 to a preheater line 134 disposed within the flashing section 108n of the final stage 106n. The preheater line 134 contains seawater previously warmed by its passage through the condenser 126, and thus assists in warming and evaporating the seawater contained within the flashing section 108n.

The preheater line 134 communicates with a supply line 136 that extends from the preheater line outlet to the inlet or orifice 138a in the base of the flashing section 108a of the first stage 106a. A brine heater 140 is installed in the supply line 136 to heat the incoming seawater or brine prior to its introduction into the first stage 106a via the first stage inlet or orifice 138a. The brine heater 140 may receive heat energy from a solar or other source, as desired. The seawater or brine flows progressively into the flashing section 108a-108n of each stage 106a through 106n-1 through successive inlets or orifices 138a through 138n, as shown in FIG. 1. The stages 106a-106n may progress from a high pressure-high temperature end 106a to a low pressure-low temperature end 106n, the pressures corresponding to the boiling point of water at the respective temperature of the stage 106a-106n. Any remaining concentrated brine then flows from the flashing section 108n of the final stage via an outlet line 142. A pump 144 is provided to assist the outflow as needed. Purified water flows in sequence through the water collection trays 118a through 118n of the successive stages, and is drained from the final collection tray 118n via a water collection line 146. A water pump 148 may be provided to assist the outflow of the purified water.

Figure 2:
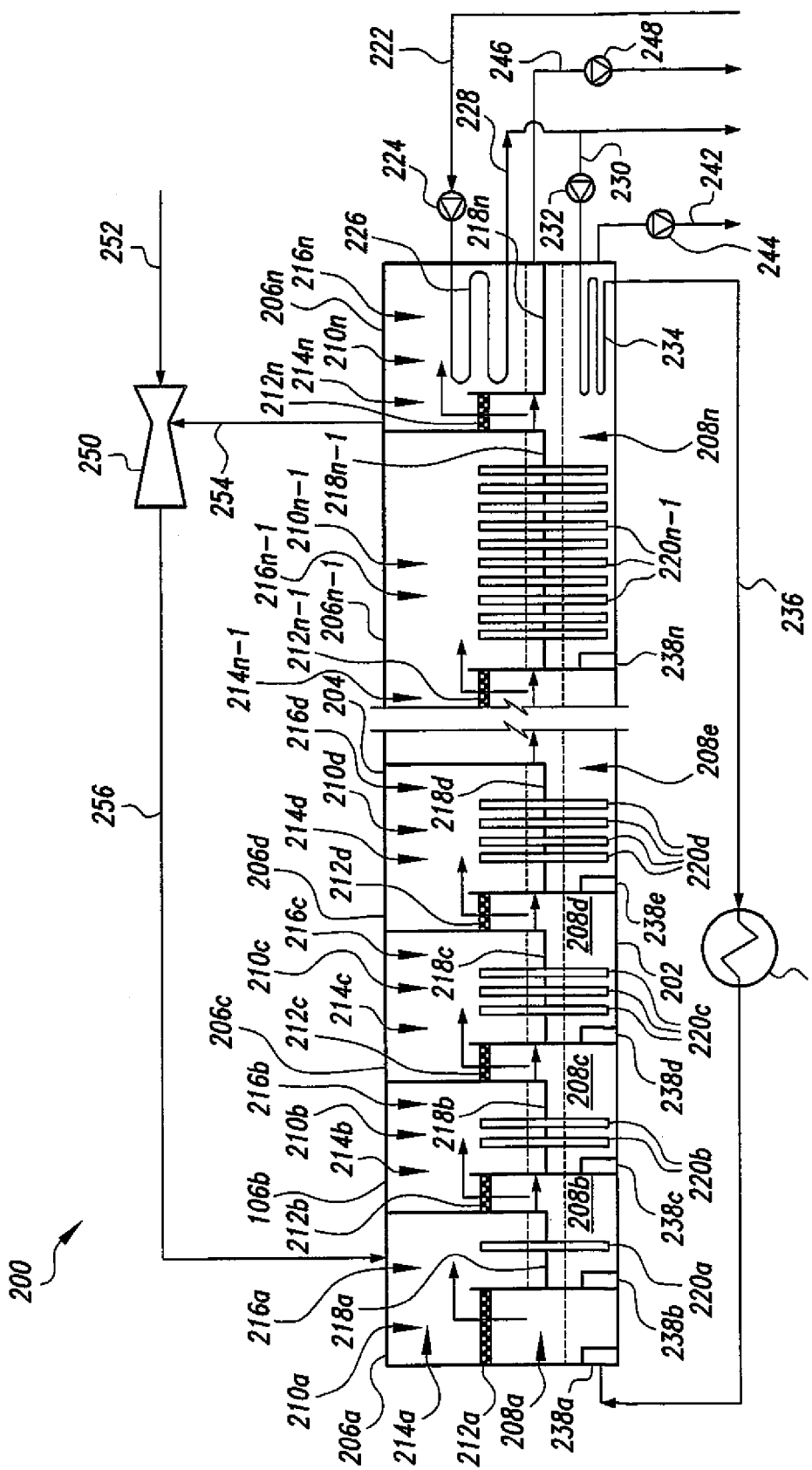
FIG. 2 is a schematic elevation view of a second embodiment of a desalination system according to the present invention.

FIG. 2 of the drawings provides a schematic elevation view of a second embodiment of the desalination system 200. The desalination system 200 is closely related to the desalination system 100 of FIG. 1. Corresponding components are designated by reference numerals having identical characters following the first digit, i.e., a "2" for the first digit for all reference numerals for the second embodiment of FIG. 2.

The desalination system 200 is a generally closed structure having a floor 202 and a ceiling 204 overlying the floor, and a sequence of stages disposed between the floor 202 and ceiling 204. The stages comprise flash chambers, including a first stage 206a, a plurality of successive intermediate stages, and a final stage 206n. The successive intermediate stages illustrated in FIG. 2 comprise a second stage 206b, a third stage 206c, a fourth stage 206d, and a penultimate stage 206n-1. As in the case of the desalination system 100 of FIG. 1, the desalination system 200 illustrated in FIG. 2 is of indeterminate length, and any practical number of successive stages may follow the first stage 206a before the final stage 206n.

Each stage 206a-206n is P-shaped and includes a flashing section 208a through 208n and a condensing section 210a through 210n. Each of the flashing sections 208a through 208n extends from the underlying floor 202 upward to a top located at some intermediate height or level above the floor 202 but below the overlying ceiling 204. A demister 212a through 212n (a device that removes droplets of liquids saline water from the fresh water vapor before the vapor enters the corresponding condensing section 210a-210n) is located between the flashing section 208a-208n and the corresponding condensing section 210a-210n, respectively, and defines each top of the flashing sections 208-208n, as illustrated in FIG. 2.

Each condensing section 210a through 210n comprises a first portion 214a through 214n extending upward from the underlying demister 212a-212n at the top of the adjacent flashing section 208a-208n to the overlying ceiling 204 of the structure, and a second portion 216a through 216n extending laterally from the first portion. The bottom of each condensing section 210a-210n second portion is defined by a water collection tray 218a through 218n, which overlies a portion of the flashing section 208b-208n of the next adjacent or successive stage.

Each stage preceding the final stage further includes at least one heat pipe having an upper portion disposed in the condensing section, continuing through the water collection tray, and extending into the flashing section of the next succeeding stage or chamber. The function and structure of these heat pipes is as described further above in the description of the heat pipes of the desalination system 100 of FIG. 1. In the embodiment of FIG. 2, a single first heat pipe 220a extends upward from the second flashing section 208b through the overlying collection tray 218a and into the second portion 216a of the preceding condensing section 210a. It will be seen in the embodiment of FIG. 2 that each successive stage contains one more heat pipe than the preceding stage, i.e., the first condensing section 210a has a single heat pipe 220a, the second condensing section 210b has two heat pipes 220b, the third condensing section 210c has three heat pipes 220c, etc., through the penultimate condensing section 210n-1. The heat pipes 220a-220n-1 transfer heat released by condensation of water vapor in the condensing sections 210a-210n-1 to the flashing sections 208b-208n of the next successive stage. This heat would otherwise be lost during the desalination process. The heat pipes 220a-220n-1 are used to provide for condensation of fresh water in each stage 206a-206n in lieu of the counterflow of the feed seawater through heat exchange tubes in conventional multi-stage flash desalination systems. While the heat pipes 220a-220n-1 are shown as straight vertical elements in FIG. 2, it should be noted that they may be formed as non-straight units and/or may have some inclination from the vertical, if desired. Pulsating operation of the heat pipe system may also be used if desired, as in the case of the first embodiment heat pipes 120a-120n-1.

Referring to FIG. 2, seawater is supplied to the desalination system 200 by an inlet line 222. A pump 224 in the inlet line 222 provides the required motive force to transfer the seawater to the system. The inlet line 222 communicates with a condenser 226 disposed within the final condensing section 210n that is used to recover fresh water from the vapor in the last flash chamber or stage 206n, the seawater being used to cool the condenser 226. After cooling the condenser 226, the seawater enters an outlet line 228 that exits the system 200 to return to its source. In the embodiment of FIG. 2, a portion of the seawater exiting the system is withdrawn via a secondary line 230 that extends from the outlet line 228 by a pump 232 to a preheater line 234 disposed within the flashing section 208n of the final stage 206n. The preheater line 234 contains seawater previously warmed by its passage through the condenser 226, and thus assists in warming and evaporating the seawater contained within the flashing section 208n.

The preheater line 234 communicates with a supply line 236 that extends from the preheater line outlet to the inlet or orifice 238a in the base of the flashing section 208a of the first stage 206a. A brine heater 240 is installed in the supply line 236 to heat the incoming seawater or brine prior to its introduction into the flashing section 208a of the first stage 206a via the first stage inlet or orifice 238a. As in the case of the first embodiment 100 of FIG. 1, the brine heater 240 of the embodiment of FIG. 2 may receive heat energy from a solar or other source, as desired. The seawater or brine flows progressively into the flashing section 208a-208n of each stage 206a through 206n through successive inlets or orifices 238a through 238n, as shown in FIG. 2. The stages 206a-206n may progress from a high pressure-high temperature end 206a to a low pressure-low temperature end 206n, the pressures corresponding to the boiling point of water at the respective temperature of the stage 206a-206n. Any remaining concentrated brine then flows from the flashing section 208n of the final stage 206n via an outlet line 242. A pump 244 is provided to assist the outflow as needed. Purified water flows in sequence through the water collection trays 218a through 218n of the successive stages 206a-206n. The purified water is then drained from the final collection tray 218n via a water collection line 246. A water pump 248 may be provided to assist the outflow of the purified water.

It will be seen that to this point, the configuration of the desalination system 200 of FIG. 2 is substantially identical to the desalination system 100 of FIG. 1. The two systems differ from one another in that the second embodiment desalination system 200 of FIG. 2 includes a thermal vapor compressor 250 to withdraw vapor from the condensation chamber 210n of the last stage 206n (or alternatively any intermediate stage 206b through 206n-1) and transfer this vapor to the condensation chamber 210a of the first stage 206a above the heat pipe(s) 220a. The thermal vapor compressor 250 receives live steam through an input line 252. The steam may be heated by a solar heat source, or other heat source as desired. The venturi of the thermal vapor compressor 250 communicates with the condensation chamber 210n of the final stage 206n (or other stage, as noted above) via a vapor supply line 254. The pressure drop through the venturi of the thermal vapor compressor 250 draws vapor from the condensation chamber 210n of the final stage 206n, and/or from any other intermediate alternative stage. The mixed steam and recovered vapor exits the thermal vapor compressor 250 to a vapor delivery line 256 that communicates with the condensation chamber 210a of the first stage 206a.

Figure 3:
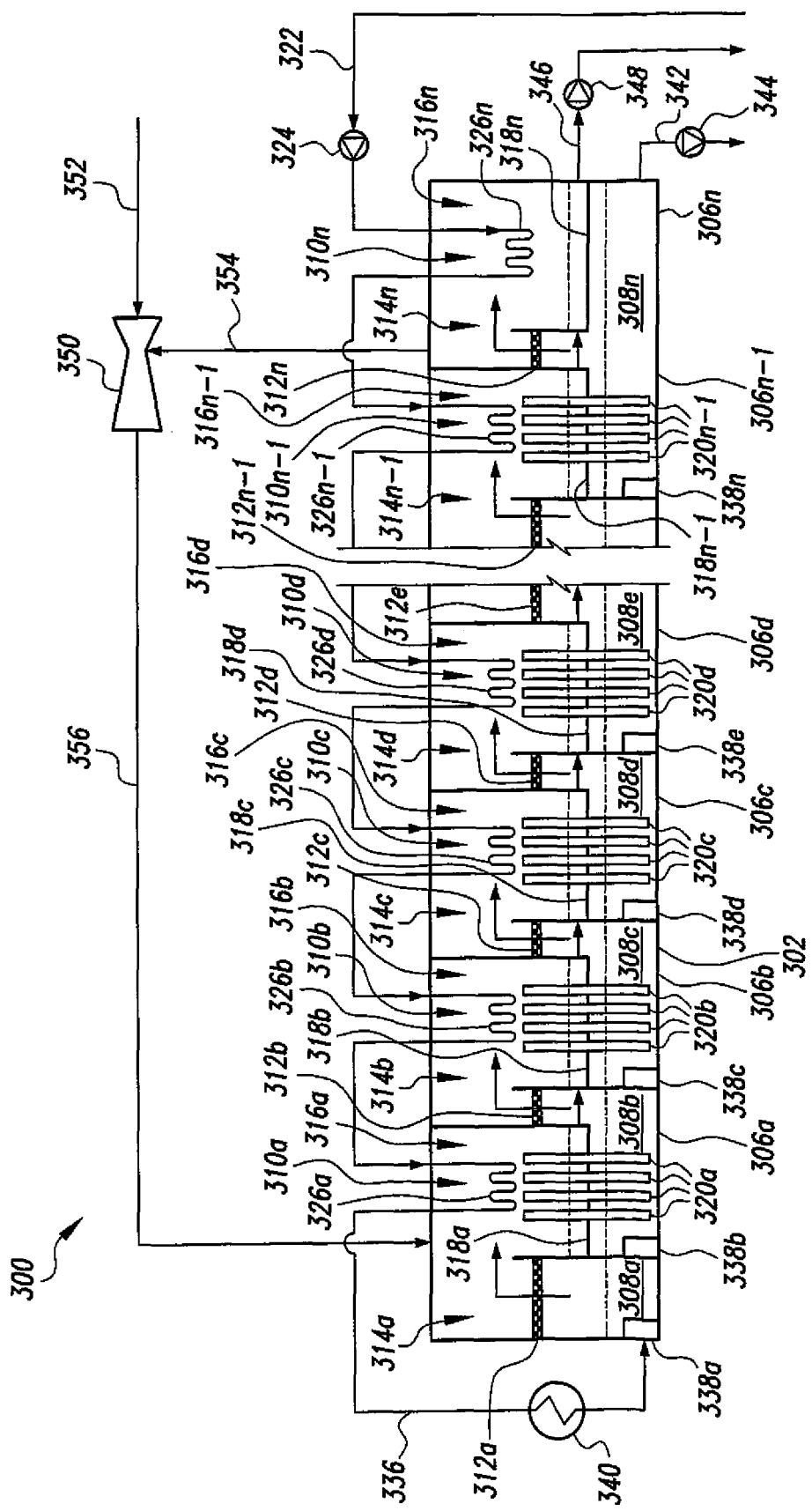
FIG. 3 is a schematic elevation view of a third embodiment of a desalination system according to the present invention.

FIG. 3 of the drawings provides a schematic elevation view of a third embodiment of a desalination system 300. The desalination system 300 is closely related to the desalination systems 100 of FIGS. 1 and 200 of FIG. 2, with corresponding components being designated by reference numerals having identical characters following the first digit, i.e., a "3" for the first digit for all reference numerals for the third embodiment of FIG. 3.

The desalination system 300 is a generally closed structure having a floor 302 and a ceiling 304 overlying the floor, and a sequence of intermediate stages disposed between the floor 302 and ceiling 304. The stages comprise a first stage 306a, a plurality of successive intermediate stages, and a final stage 306n. The successive intermediate stages illustrated in FIG. 3 comprise a second stage 306b, a third stage 306c, a fourth stage 306d, and a penultimate stage 306n-1. As in the cases of the desalination systems 100 of FIGS. 1 and 200 of FIG. 2, the desalination system 300 illustrated in FIG. 3 is of indeterminate length, and any practical number of successive stages may follow the first stage 306a before the final stage 306n.

Each stage 306a-306n is P-shaped and includes a flashing section 308a through 308n and a condensing section 310a through 310n. Each of the flashing sections 308a through 308n extends from the underlying floor 302 upward to a top located at some intermediate height or level above the floor 302 but below the overlying ceiling 304, as in the flashing section configurations of FIGS. 1 and 2. A demister 312a through 312n separates the flashing section 308a through 308n from the condensing section 310a-310n in each stage 306a-306n and defines the top of each flashing section 308a-308n, as illustrated in FIG. 3. The demisters 312a-312n remove any droplets of liquid saline water entrained in the fresh water vapor before the water vapor enters the corresponding condensing section 310a-310n.

Each condensing section 310a through 310n comprises a first portion 314a through 314n extending upward from the underlying demister 312a-312n at the top of the adjacent flashing section 308a-308n to the overlying ceiling 304 of the structure, and a second portion 316a through 316n extending laterally from the first portion 314a-314n. The bottom of each condensing section second portion 316a-316n is defined by a water collection tray 318a through 318n, which overlies a portion of the flashing section 308b-308n of the next adjacent or successive stage 306b-306n.

The desalination system 300 of FIG. 3 differs from the other two embodiments of FIGS. 1 and 2 in that each stage preceding the final stage includes a plurality of heat pipes therein. As in the other embodiments, the heat pipes having an upper portion disposed in the condensing section, continuing through the water collection tray, and extending into the flashing section of the next succeeding stage or chamber. The function and structure of these heat pipes is as described further above in the description of the heat pipes of the first desalination system 100 of FIG. 1. In the embodiment of FIG. 3, four heat pipes 320a extend upward from the second flashing section 308b through the overlying collection tray 318a and into the second portion 316a of the preceding condensing section 310a. It will be seen in the embodiment of FIG. 3 that all successive stages through the penultimate stage 306n-1 contain identical numbers of heat pipes, i.e., the second condensation chamber 310b has four heat pipes 320b, the third condensation chamber 310c has four heat pipes 320c, etc., through the penultimate condensation chamber 310n-1. While the heat pipes 320a-320n-1 are shown as straight vertical elements in FIG. 3, it should be noted that they may be formed as non-straight units and/or may have some inclination from the vertical, if desired. Pulsating operation of the heat pipe system may also be used if desired, as in the case of the first embodiment heat pipes 120a-120n-1 of FIG. 1 and second embodiment heat pipes 220a-220n-1 of FIG. 2.

The water and vapor pipe or plumbing system of the desalination system 300 of FIG. 3 also differs from the corresponding plumbing systems of the desalination systems 100 and 200 of FIGS. 1 and 2. As in the case of the first two embodiments, seawater is supplied to the desalination system 300 by an inlet line 322. A pump 324 in the inlet line 322 provides the required motive force to transfer the seawater to the system. However, rather than having a condenser located in the final stage, as in the first two embodiments, the third desalination system 300 incorporates a plurality of heat exchange tubes 326a-326n or heat exchangers connected in series in the condensing sections 310a-310n of each stage 306a-306n. The final stage heat exchange tube or heat exchanger 326n is connected to and communicates directly with the inlet line 322. The heat exchanger 326n-1 of the penultimate stage 306n-1 is connected in series and communicates with the heat exchanger 326n, the next heat exchanger 326d is connected in series and communicates with the heat exchanger 326n-1, etc., to the first heat exchange line or heat exchanger 326a located in the condensing section 310a of the first stage 306a. The stages 306a-306n progress from a high pressure-high temperature end 306a to a low pressure-low temperature end 306n, the pressures corresponding to the boiling point of water at the respective temperature of the stage 306a-306n. Thus, the seawater feed is progressively heated as it proceeds through the heat exchanger tubes 326n through 326a. Also, the water vapor in each stage 306a-306n condenses on both the heat exchanger tubes 326a-326n and the heat pipes 320a-320n, falling into the collection trays 318a-318n as purified water. The provision of the series of heat exchanger tube units 326a-326n-1 result in the desalination system 300 of FIG. 3 functioning as a combination multi-effect desalination (MED) system and multi-stage flash (MSF) system in a single physical structure, and providing the benefits of both such systems.

The outlet end of the first heat exchange line or heat exchanger 326a exits the condensation chamber 310a of the first stage 306a and continues to a brine heater 340 installed in the supply line 336 outside the housing to heat the incoming seawater or brine prior to its introduction into the first stage evaporation chamber 308a via the first stage inlet or orifice 338a. As in the case of the first and second embodiments respectively of FIGS. 1 and 2, the brine heater 340 of the third embodiment of FIG. 3 may receive heat energy from a solar or other source, as desired. The seawater conveyed by the supply line 336 is released into the first flashing section 308a, at the hot end 306a of the sequence of flash chambers 306a-306n.

The seawater or brine flows progressively into the flashing section of each stage 306a through 306n through successive inlets or orifices, respectively 338a through 338n, as shown in FIG. 3. Any remaining concentrated brine then flows from the flashing section 308n of the final stage via an outlet line 342. A pump 344 is provided to assist the outflow as needed. Purified water flows in sequence through the water collection trays 318a through 318n of the successive stages 306a-306n and is drained from the final collection tray 318n via a water collection line 346. A water pump 348 may be provided to assist the outflow of the purified water.

Other than the different seawater routing or plumbing system, the desalination system 300 of FIG. 3 is quite similar to the desalination system 200 of FIG. 2. The desalination system 300 of FIG. 3 also includes a thermal vapor compressor 350 to withdraw vapor from the condensation chamber 310n of the last stage 306n (or alternatively any intermediate stage 306b through 306n-1) and transfer this vapor to the condensation chamber 310a of the first stage 306a. The thermal vapor compressor 350 operates as described above for the thermal vapor compressor 250 of the desalination system 200 of FIG. 2, i.e., it receives live steam through an input line 352. As in the case of the second embodiment of FIG. 2, the steam may be heated by a solar heat source, or other heat source as desired. The venturi of the thermal vapor compressor 350 communicates with the condensation chamber 310n of the final stage 306n (or other stage, as noted above) via a vapor supply line 354. The pressure drop through the venturi of the thermal vapor compressor 350 draws vapor from the condensation chamber 310n of the final stage 306n or other alternative stage. The mixed steam and recovered vapor exits the thermal vapor compressor 350 to a vapor delivery line 356 that communicates with the condensation chamber 310a of the first stage 306a.

It is to be understood that the present invention is not limited to the embodiments described above, but encompasses any and all embodiments within the scope of the following claims.

We claim:

1. A desalination system, comprising:
   a floor;
   a ceiling overlying the floor;
   a plurality of stages disposed between the floor and the ceiling, the stages including a first stage, at least one successive intermediate stage, and a final stage disposed in linear sequence, each stage being a substantially P-shaped flash chamber having:
      a flashing section extending upward from the floor;
      a condensing section having a first portion extending above the flashing section to the ceiling and a second portion extending laterally from the first portion, the second portion of the condensing section having a collection tray overlying a portion of the flashing section of the next successive stage of the sequence; and
   at least one heat pipe vertically extending from the condensing section through the collection tray and into the flashing section of the next succeeding stage in the sequence;
   wherein heat released by condensation of flashed water vapor on the at least one heat pipe is transferred to the flashing section of the next succeeding stage by the at least one heat pipe; and
   a water intake system having:
      an inlet line;
      a condenser disposed within the condensing section of the final stage, the condenser communicating with the inlet line;
      an outlet line communicating with the condenser;
      a preheater disposed within the flashing section of the final stage, the preheater communicating with the outlet line; and
      a supply line extending from the preheater to the flashing section of the first stage having a brine heater disposed in the supply line between the preheater and the first stage;
   wherein a seawater feed cools the condenser for condensation of fresh water in the condensing section of the final stage before being fed to the flashing section of the first stage.

2. The desalination system according to claim 1, further comprising a thermal vapor compressor transferring flashed water vapor from the condensing section of at least one of the stages to the condensing section of the first stage.

3. The desalination system according to claim 1, further comprising a heat exchange tube disposed within the condensing section of each one stage of the plurality of stages;
   wherein the supply line communicating with the flashing section of the first stage, and the inlet line, the heat exchange tubes, and the supply line disposed in series with one another.

4. The desalination system according to claim 1, wherein:
   the at least one heat pipe consists of a single heat pipe in the first stage; and the at least one heat pipe increases by one additional heat pipe in each of the successive intermediate stages in the sequence after the first stage up to the final stage.

5. The desalination system according to claim 1, further comprising a demister separating the flashing section from the condensing section in each the stage.

6. A desalination system, comprising:
a floor;
a ceiling overlying the floor;
a plurality of stages disposed between the floor and the ceiling, the stages including a first stage, at least one successive intermediate stage, and a final stage in linear sequence, each of the stages having:
a flashing section extending upward from the floor;
at least one heat pipe;
a condensing section communicating with the corresponding flashing section, the condensing section having a first portion extending above the flashing section to the ceiling and a second portion extending laterally from the first portion and overlying the flashing section of the next succeeding stage in the sequence, the second portion having a collection tray disposed therein for receiving purified water condensed on the at least one heat pipe;
wherein each one of the at least one heat pipe extending between the condensing section and the flashing section of the next succeeding stage in the sequence up to the final stage; and
a thermal vapor compressor transferring flashed water vapor from the condensing section of at least one of the stages to the condensing section of the first stage;
wherein heat released by condensation of flashed water vapor on the at least one heat pipe is transferred to the flashing section of the next succeeding stage by the at least one heat pipe.

7. The desalination system according to claim 6, further comprising a water intake system having;
an inlet line;
a condenser disposed within the condensing section of the final stage, the condenser communicating with the inlet line;
an outlet line communicating with the condenser;
a preheater disposed within the flashing section of the final stage, the preheater communicating with the outlet line; and
a supply line extending from the preheater to the flashing section of the first stage;
wherein a seawater feed cools the condenser for condensation of fresh water in the condensing section of the final stage before being fed to the flashing section of the first stage.

8. The desalination system according to claim 7, further comprising a brine heater disposed in the supply line between the preheater and the first stage.

9. The desalination system according to claim 6, further comprising:
an inlet line;
a heat exchange tube disposed within the condensing section of each one stage of the plurality of stages;
a supply line communicating with the flashing section of the first stage, the inlet line, the heat exchange tubes, and the supply line disposed in series with one another; and
a brine heater disposed in the supply line between the heat exchange tubes and the flashing section of the first stage.

10. The desalination system according to claim 6, wherein:
the at least one heat pipe consists of a single heat pipe in the first stage; and
the at least one heat pipe increases by one additional heat pipe in each of the successive intermediate stages in the sequence after the first stage up to the final stage.

11. A desalination system, comprising:
a floor;
a ceiling overlying the floor;
a plurality of stages disposed between the floor and the ceiling, the stages including a first stage, at least one successive intermediate stage, and a final stage in linear sequence, each of the stages being a flash chamber having:
a flashing section extending upward from the floor;
a condensing section having a first portion extending above the flashing section to the ceiling and a second portion extending laterally from the first portion, the second portion of the condensing section having a collection tray overlying a portion of the flashing section of the next successive stage of the sequence;
a thermal vapor compressor; and
at least one heat pipe extending from the condensing section through the collection tray and into the flashing section of the next succeeding stage in the sequence; and
a water intake system, including;
an inlet line;
a condenser disposed within the condensing section of the final stage, the condenser communicating with the inlet line;
an outlet line communicating with the condenser;
a preheater line disposed within the flashing section of the final stage, the preheater line communicating with the outlet line; and
a supply line extending from the preheater line to the flashing section of the first stage;
a brine heater disposed in the supply line between the preheater line and the first stage;
wherein a seawater feed cools the condenser for condensation of fresh water in the condensing section of the final stage before being fed to the flashing section of the first stage; and
wherein heat released by condensation of flashed water vapor on the at least one heat pipe is transferred to the flashing section of the next succeeding stage by the at least one heat pipe.

12. The desalination system according to claim 11, further comprising a demister separating the flashing section from the condensing section in each stage.

13. The desalination system according to claim 11 wherein the thermal vapor compressor transfers flashed water vapor from the condensing section of at least one of the stages to the condensing section of the first stage.

14. The desalination system according to claim 11, wherein:
the at least one heat pipe consists of a single heat pipe in the first stage; and
the at least one heat pipe increases by one additional heat pipe in each of the successive intermediate stages in the sequence after the first stage up to the final stage.

* * * * *